J. LE C. DAVIS.
DYNAMO ELECTRIC MACHINE.
APPLICATION FILED JUNE 14, 1912.
1,115,406.
Patented Oct. 27, 1914.
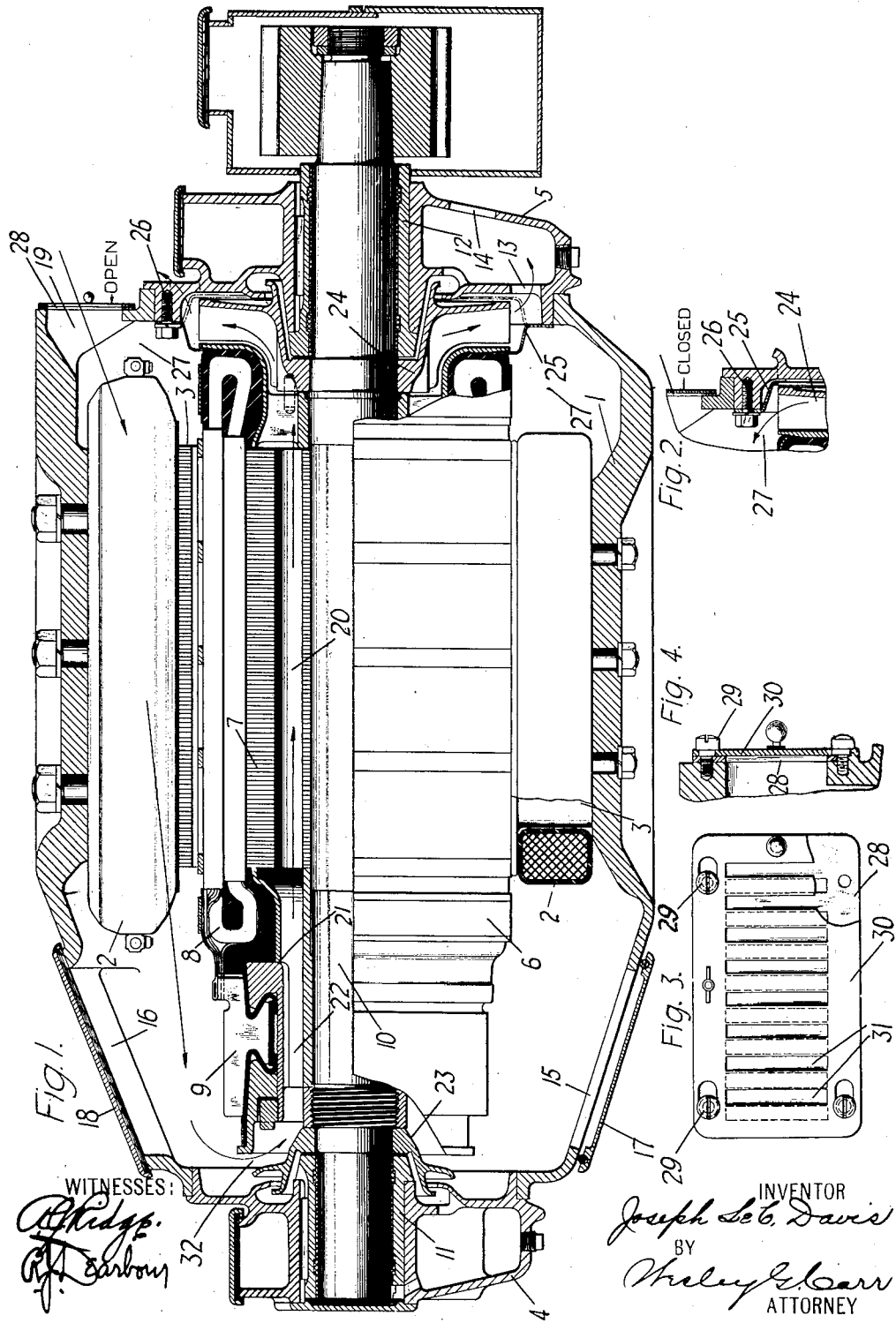
WITNESSES:
INVENTOR
Joseph Le C. Davis
BY
Wiley S. Carr
ATTORNEY

UNITED STATES PATENT OFFICE.

JOSEPH LE CONTE DAVIS, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,115,406.  Specification of Letters Patent. Patented Oct. 27, 1914.

Application filed June 14, 1912. Serial No. 703,632.

REISSUED

*To all whom it may concern:*

Be it known that I, JOSEPH LE C. DAVIS, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and it has special reference to motors of the railway type and similar machines which are liable to become overheated in service.

The object of my invention is to provide a machine of the class above indicated that shall embody simple and efficient means for automatically preventing the overheating of any of its parts under varying conditions of operation.

I am aware that fans and other similar devices have formed parts of the rotatable members of dynamo-electric machines, but, so far as I am aware, such machines have not hitherto been provided with means adapted to be so adjusted as to produce either an entirely local circulation of air within the frame of an inclosed motor or similar machine or a circulation of air from outside of the frame through a suitable inlet, around the heated parts of the machine and out at another point.

According to my present invention, I provide a structure having the above specified characteristics which are of special value in motors of the railway type.

Figure 1 of the accompanying drawings is a partially sectional elevation of a railway motor embodying my invention. Fig. 2 is a fragmentary view, corresponding to a portion of Fig. 1, illustrating the deflector adjusted to a different position, and Figs. 3 and 4 are detail views of the damper or grid which is shown in outline in Fig. 1.

Referring to the drawings, the machine here shown comprises a stationary frame 1, having field magnet coils 2 mounted on polar projections 3, bearing housings 4 and 5, and an armature 6 having a laminated core member 7, a winding 8, a commutator cylinder 9 and a shaft 10. The armature is rotatively supported in bearings 11 and 12 which are respectively supported in the bearing housings 4 and 5.

The frame 1 is provided with outlet openings 13 and 14 through the housing 5, openings 15 and 16 which are closed by commutator covers 17 and 18, and an inlet 19 through which cool air may be admitted to the interior of the motor frame.

The laminated core member 7 of the armature is provided with longitudinal passages 20, and a bushing 21, on which the commutator cylinder 9 is mounted, is provided with passages 22 to register with the passages 20.

A deflector ring 23 is mounted on the shaft 10 adjacent to the bearing 11, and a combined fan and deflector 24 is mounted on the shaft 10 adjacent to the bearing 12. A deflector 25 is removably secured to the housing 5 by means of bolts 26 and is adapted to be reversed to direct the circulation of air created by the fan 24, when the motor is in operation, either outwardly through the openings 13 and 14 or inwardly through a passage 27 between the housing 5 and the adjacent end of the winding 8 (see Fig. 2). If the frame 1 is composed of two separable parts, access to the member 25 for effecting its reversal may be had by separating such parts, but, if the frame is of the one-piece or so-called box type, access may be had to the member 25 for effecting its reversal by removing some of the adjacent parts of the motor structure.

The inlet 19 is provided with a damper comprising a stationary grid 28 secured to the frame 1 by bolts 29 and a sliding grid 30 which is held in position by the heads of the bolts 29 but is adapted to slide longitudinally with reference to the grid 28 and either register with it to provide a series of openings 31 or to cover the openings in the under grid and thus close the inlet 19.

If the motor operates under a street car or in any other position where it is liable to be exposed to the weather, the inlet opening 19 should be closed in the winter when snow is likely to enter. The deflector 25 should then be mounted as shown in Fig. 2. Assuming that the motor is operating under these conditions, the fan 24 produces a circulation of air from the longitudinal passages 20 and 22 outwardly through the fan and the passages 27, back between the polar projections 3 of the field frame and around the field coils over the outer surface of the commutator cylinder 9 and through passages 32 to the passages 22. The circulation of air thus created serves to prevent overheating of any of the parts of the motor by maintaining all of the parts at a substantially uniform temperature. Furthermore, the closed circulation will usually be maintained only when there is danger of snow entering the motor and, consequently, when the temperature of the outside atmosphere, which is in contact with the exposed surfaces of the motor frame, is relatively low. It may also be found desirable to utilize the closed circulation when the motor is subjected to large quantities of dust and grit.

When there is no danger of snow or other foreign matter entering the motor frame, the grid 30 is preferably so adjusted as to open the inlet openings 31 and the deflector 25 is changed to the position shown in Fig. 1. When the motor is operating under these conditions, the fan 24 forces the air outwardly from the passages 22 and 20 through the openings 13 and 14 in the housing 5. The hot air from the interior of the motor is thus continually removed and is replaced by relatively cool air which enters through the inlet 19, passes between the polar projections 3 and around the field magnet coils 2, over the outer surface of the commutator cylinder and through the passages 32.

While my invention is particularly well adapted for use with motors of the railway type, it is not limited for use in connection with any size or type of dynamo-electric machine, and I desire that only such limitations shall be imposed as are indicated in the appended claims.

I claim as my invention:

1. A motor comprising a stationary member, a rotatable member, a substantially closed casing, means for creating a circulation of air as the motor operates, and adjustable means for directing the circulation of air either in a closed circuit within the frame or in an open circuit including passages in the stationary and rotatable parts of the motor and an opening to the outside atmosphere.

2. A dynamo-electric machine comprising a stator, an inclosing casing, a rotor, means for creating a circulation of air as the motor operates, and adjustable means for directing the circulation of air either in a closed circuit within the frame or in an open circuit including passages in the stator and rotor of the machine and an opening to the outside atmosphere.

3. A dynamo-electric machine comprising a stator, an inclosing casing, a rotor, means forming a part of the rotatable member for creating a circulation of air, and adjustable means for directing the circulation of air either in a closed circuit within the frame or in an open circuit including passages in the stator and rotor of the machine, and an opening to the outside atmosphere.

4. An electric motor comprising a substantially closed frame having relatively small inlet and outlet openings, a rotatable member, a fan carried by said member, a deflector secured to the stationary frame and an adjustable damper for closing and opening the inlet in the frame, the deflector being adapted to be reversed and the damper to be adjusted to effect either a closed circulation of air within the casing or an open circulation through the inlet and outlet openings.

5. An electric motor comprising a substantially closed frame having relatively small inlet and outlet openings, a rotatable armature, a frame carried thereby, a reversible deflector secured to the stationary frame for directing the circulation of air produced by the fan, and an adjustable damper for closing and opening the inlet in the frame.

6. An electric motor comprising a substantially closed frame having relatively small inlet and outlet openings, a rotatable armature, a frame carried thereby, a reversible deflector secured to the stationary frame for directing the circulation of air produced by the fan, and an adjustable damper for closing and opening the inlet in the frame according to the position occupied by the deflector.

In testimony whereof, I have hereunto subscribed my name this 4th day of June, 1912.

JOSEPH LE CONTE DAVIS.

Witnesses:
 JOHN S. DEAN,
 B. B. HINES.